E. H. OVERSMITH.
STEERING MECHANISM.
APPLICATION FILED FEB. 19, 1917.
1,252,610.
Patented Jan. 8, 1918.
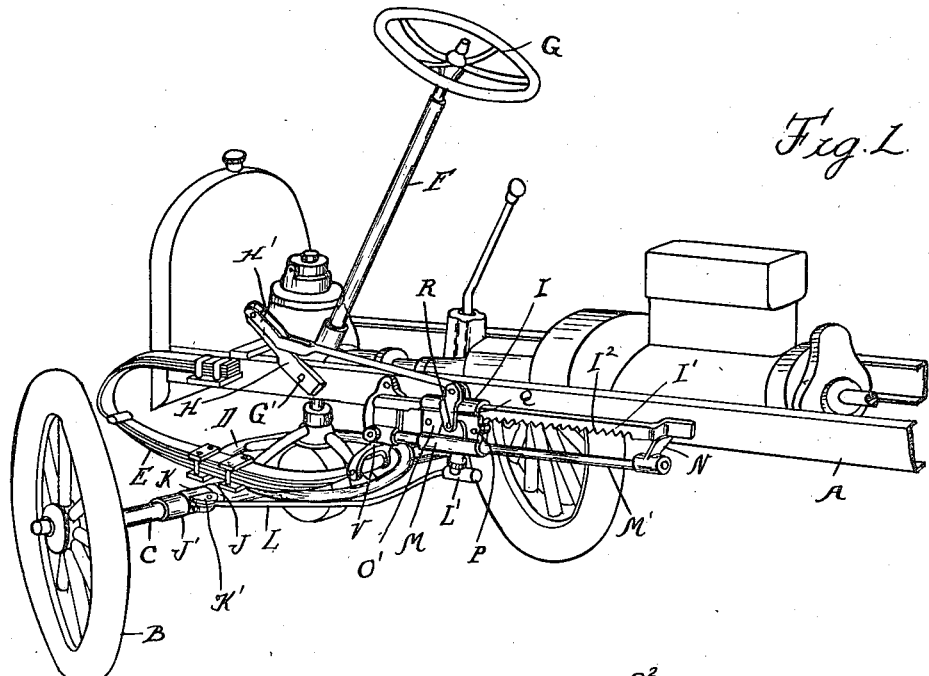
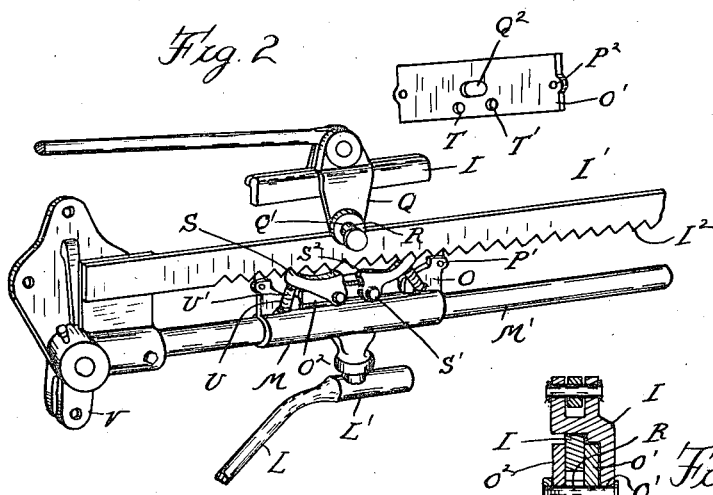
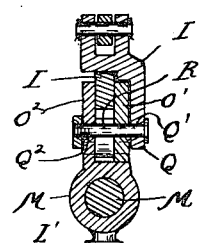
Inventor
Elmer H. Oversmith
Attorneys

UNITED STATES PATENT OFFICE.

ELMER H. OVERSMITH, OF JONESVILLE, MICHIGAN, ASSIGNOR, BY MESNE ASSIGNMENTS, TO BRAZIL MOTORS COMPANY, OF BRAZIL, INDIANA, A CORPORATION OF INDIANA.

STEERING MECHANISM.

1,252,610.  Specification of Letters Patent.  Patented Jan. 8, 1918.

Application filed February 19, 1917. Serial No. 149,500.

*To all whom it may concern:*

Be it known that I, ELMER H. OVERSMITH, a citizen of the United States of America, residing at Jonesville, in the county of Hillsdale and State of Michigan, have invented certain new and useful Improvements in Steering Mechanism, of which the following is a specification, reference being had therein to the accompanying drawings.

The invention relates to steering mechanism for a motor vehicle and particularly to the mechanism intermediate the steering wheels and the hand wheel assembly. The object of the invention is to obtain a construction which effects the steering but prevents the transmission of the vibration of the steering wheels to the hand wheel. Another object of the invention is to obtain a construction which is simple and substantial and at the same time is efficient in operation. Other objects of the invention will more fully hereinafter appear.

In the drawings:

Figure 1 is a perspective view of the construction embodying my invention;

Fig. 2 is a perspective view of the intermediate connecting mechanism with the parts separated; and Fig. 3 is a sectional view of the intermediate connecting mechanism.

A represents the frame of the motor vehicle, B the steering wheels at the opposite ends of the front axle C, D the fifth wheel mounted upon the front axle and E the springs supporting the frame upon the fifth wheel.

Suitably mounted upon the frame A is the hand wheel assembly F of any usual construction and comprising the hand wheel G and the rock shaft $G'$ adapted to be actuated thereby. Securely mounted upon the rock shaft $G'$ is the rock arm H to the free end of which is pivotally secured one end of the rod $H'$, the opposite end thereof being pivotally connected to the slide I mounted upon the guide bar $I'$ suitably secured to the frame A at its ends, the intermediate portion being spaced therefrom. Sleeved upon the front axle and longitudinally held in position thereon between the spring clip J and the collar $J'$ is the member K having the bifurcated lug portion $K'$. The rod L is pivotally secured at one end to the bifurcated lug portion $K'$, the opposite end thereof having the ball and socket connection $L'$ with the slide M mounted upon the guide bar $M'$ secured at its ends to the frame A by means of the downwardly extending brackets N.

The slide M is provided with the lugs O near opposite ends thereof and the side plates $O'$ and $O^2$ on opposite sides of the lugs, the side plate $O^2$ being preferably integral with the slide M and the lugs O and the side plate $O'$ being detachably secured thereto by means of the bolts P engageable with the holes $P'$ in the lugs O and the corresponding holes $P^2$ in the detachable plate. The slide I is provided with the bifurcated downwardly extending portion Q adapted to embrace the side plates $O'$ and $O^2$ and having the aperture $Q'$ therein. The side plates $O'$ and $O^2$ are each provided with the aperture $Q^2$ in alinement with the aperture $Q'$, for the insertion of the pin R.

As thus far described it is seen that by turning the hand wheel G the slide I will be moved longitudinally of the guide bar $I'$, thereby correspondingly moving the slide M upon the guide bar $M'$ which in turn effects the steering of the vehicle.

For the purpose of preventing the transmission of the vibrations of the steering wheels to the hand wheel the guide bar $I'$ is provided with the series of teeth $I^2$ upon its lower side and the slide M is provided with the oppositely and upwardly extending dogs S engageable with the series of teeth $I^2$ and inclosed between the side plates $O'$ and $O^2$ and the lugs O, these dogs having the pivots $S'$ for engaging the apertures T and $T'$ in the side plates. The lugs O each are provided with the recess U for containing the coiled springs $U'$ which yieldably retain the dogs S in engagement with the series of teeth $I^2$. To permit of sufficient downward movement of the dogs about their pivots so that the same may be disengaged from the teeth the lugs O are provided with the concaved upper and inner surfaces $O^3$. The dogs S are provided with the upwardly extending shoulders $S^2$ adapted for engagement with the pin R located therebetween. To permit of the disengagement of either dog from the series of teeth the apertures $Q^2$ in the side plates O' and O² are elongated so that the pin R may first engage either of the dogs to rock the same out of disengagement with the teeth, before engaging the ends of the apertures. After disengagement has taken place the pin R contacts with the ends of the elongated apertures and upon further movement of the slide I correspondingly moves the slide M.

In operation the dogs S are normally in engagement with the series of teeth I² but if it is desired to move the slide M to the rearward to steer the vehicle to the left the slide I is moved to the rearward and with it the pin R which engages the upwardly extending shoulders S² of the rear dog S and rocks the latter downward to disengage the same from the teeth I². At the end of the disengaging operation the pin R contacts with the rear end of the elongated slot Q² in the side plates and upon continual rearward movement of the slide I moves the slide M rearward.

Another feature of my invention resides particularly in the bracket construction at the forward end of the guide bar M'. As shown this bracket N besides carrying the guide bars I' and M' has the downwardly extending portion V for carrying one end of the spring E.

What I claim as my invention is:

1. In a steering mechanism, a steering wheel, a hand wheel, a sliding member adapted to be actuated by said hand wheel, a second sliding member adapted to actuate said steering wheel, means adjustably connecting said sliding members, and means for preventing the operation of said second sliding member from said steering wheel.

2. In a steering mechanism, the combination with a steering wheel, of a hand wheel, a slide connected to said steering wheel, a second slide connected to said hand wheel provided with a portion embracing said first mentioned slide, a pin passing through said slides and dogs mounted upon said first mentioned slide for preventing the operation thereof from said steering wheel.

3. In a steering mechanism, the combination with a steering wheel, of a hand wheel, a slide connected to said steering wheel, a second slide connected to said hand wheel, a member provided with a series of teeth adjacent said first mentioned slide and oppositely extending dogs upon said first mentioned slide engageable with said series of teeth and a pin engaging said slides and engageable with said dogs for rocking either out of engagement with said series of teeth.

4. In a steering mechanism, the combination with a steering wheel, and a hand wheel, of guide bars, a sliding member upon one of said guide bars connected to said steering wheel, a sliding member upon the other of said guide bars connected to said hand wheel, a connection between said sliding members permitting of lost motion and dogs upon said first mentioned sliding member engageable with the guide bar for said second mentioned sliding member adapted to be operated by said connection between said sliding members.

5. In a steering mechanism, the combination with a steering wheel, of a hand wheel, a guide bar having a series of teeth upon its lower edge, a second guide bar adjacent to said first mentioned guide bar, a slide upon said second mentioned guide bar connected to said steering wheel provided with side plates, having apertures therein, upwardly and oppositely extending dogs mounted in said side plates and engageable with the teeth upon said first mentioned guide bar, a slide upon said first mentioned guide bar connected to said hand wheel and provided with a downwardly extending bifurcated portion having a transverse aperture therethrough and a pin passing through said transverse aperture and the apertures in said side plates intermediate said dogs, the apertures in said side plates being elongated to permit of the disengagement of either of said dogs before actuating said first mentioned slide.

6. The combination of a steering wheel, a hand wheel mounted upon a frame, a spring between said frame and steering wheel, a plurality of guide bars, sliding members for engaging said guide bars connected to each other and a bracket at one end of said guide bars for securing the same to said frame, said bracket being provided with a portion for engaging the spring supporting said frame upon said steering wheel.

7. The combination with a steering wheel, and a sliding member adapted to actuate said steering wheel, of a hand wheel and a sliding member adapted to be actuated by said hand wheel, dogs upon said first-mentioned sliding member for preventing movement of said second-mentioned sliding member from the first, and means for actuating said dogs and moving said first-mentioned sliding member from the second-mentioned sliding member.

8. In a steering mechanism, a steering wheel, a hand wheel, a sliding member adapted to be actuated by said hand wheel, a second sliding member adapted to actuate said steering wheel, means for actuating said second sliding member from the first mentioned sliding member and means for locking said second sliding member in its adjusted position, said locking means adapted to be unlocked upon movement of the first mentioned sliding member.

9. In a steering mechanism, a steering wheel, a hand wheel, a sliding member adapted to be actuated by said hand wheel, a second sliding member adapted to actuate said steering wheel, both of said sliding members being longitudinally slidable parallel to each other, actuating means for the second sliding member from the first mentioned sliding member, and dogs upon said second sliding member for locking the same in its adjusted positions, adapted to be operated to unlock upon movement of said actuating means.

In testimony whereof I affix my signature.

ELMER H. OVERSMITH.